United States Patent [19]
Dodge

[11] Patent Number: 5,377,664
[45] Date of Patent: Jan. 3, 1995

[54] PORTABLE SPACE HEATER

[76] Inventor: James L. Dodge, 375 "A" Owosso Dr., Eugene, Oreg. 97404

[21] Appl. No.: 243,818
[22] Filed: May 17, 1994
[51] Int. Cl.⁶ ............................................. A61F 7/00
[52] U.S. Cl. .................................... 126/204; 126/206; 126/263 R
[58] Field of Search .................... 126/261, 263 R, 246, 126/269, 204, 206, 207, 273.5, 208, 262, 266, 77, 263 A, 59, 66; 220/676, 501, 553, 555

[56] References Cited
U.S. PATENT DOCUMENTS

| | | | |
|---|---|---|---|
| 1,475,163 | 11/1923 | Allport | 126/206 |
| 2,698,646 | 1/1955 | Hepworth | 126/204 |
| 3,311,107 | 3/1967 | Vander Jagt | 126/204 |
| 3,797,643 | 3/1974 | Shupp | 126/204 |
| 4,691,688 | 9/1987 | Urso | 126/208 |

*Primary Examiner*—James C. Yeung
*Attorney, Agent, or Firm*—James D. Givnan, Jr.

[57] ABSTRACT

A box structure having partitioned compartments in which heat packs are deposited. Multiple series of holes in the box outer walls admit a convective airflow for passage upwardly past the packs and through apertured partitions into a central chamber of the box structure and ultimately through vent openings in a closure of the box structure into the area to be heated.

3 Claims, 1 Drawing Sheet

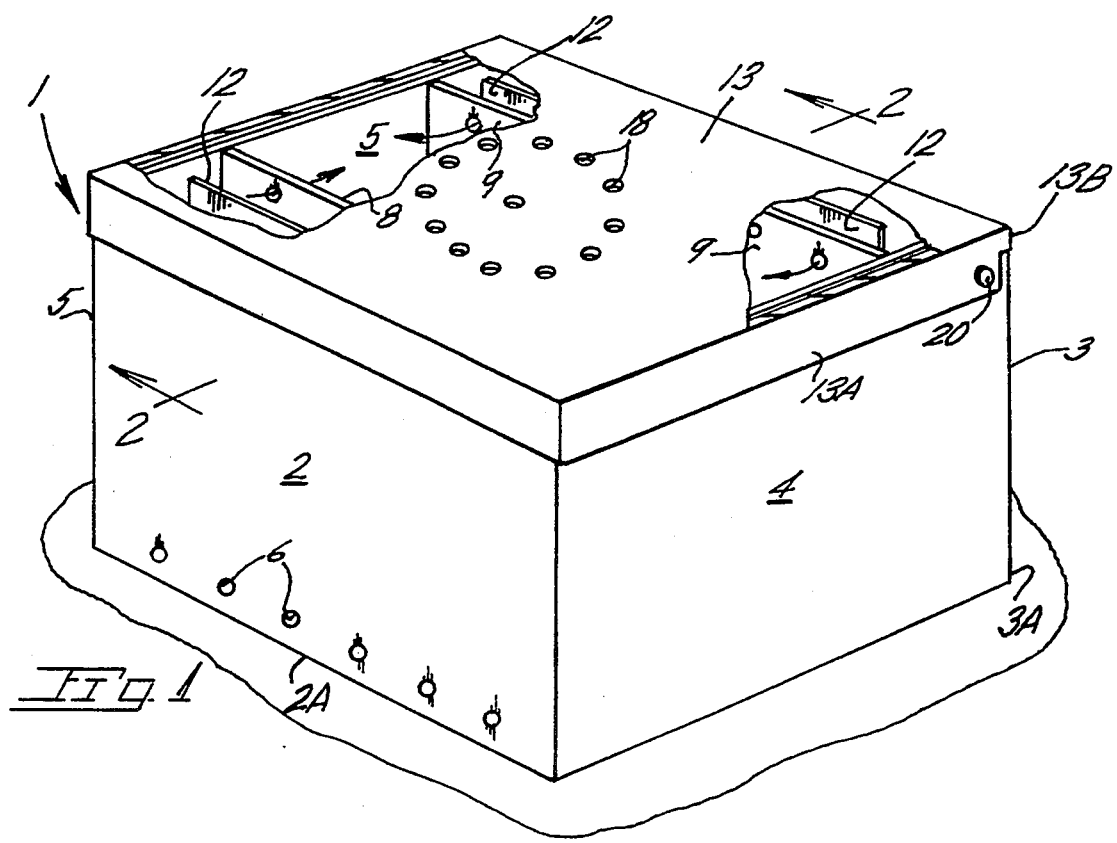
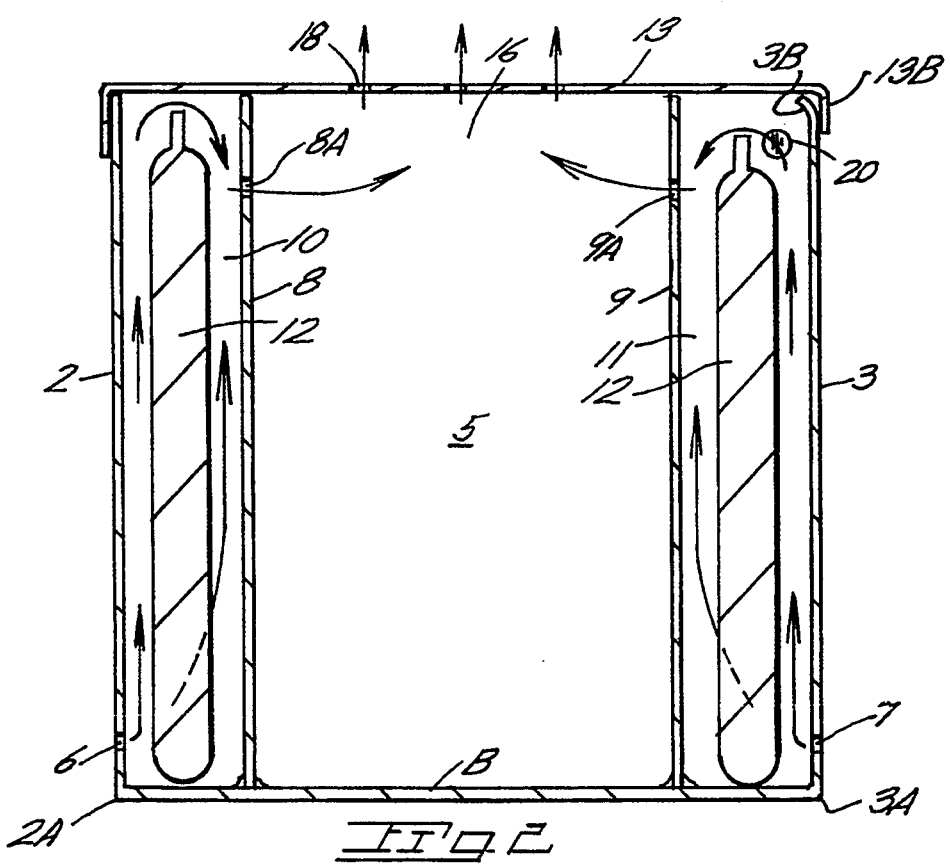

PORTABLE SPACE HEATER

BACKGROUND AND SUMMARY OF THE INVENTION

The present invention pertains generally to heaters for use in locations where an electrical power source is unavailable.

Personal heaters using chemical heat packs or packets which may be activated on demand are well known. Such packs may be placed in a pocket of a jacket or parka and have been utilized to heat cushions for spectators viewing sporting events. Typically such heat packs are used repeatedly with the heat source reactivated by subjecting the heat pack to heat such as boiling water or an oven.

The present heater utilizes such heat packs to provide a space heater wherein convective air flows are adequate to heat a small habitable area such as a tent, camper, recreational vehicle, etc.,.

The present heater includes a box structure provided with compartments in which is deposited heat packs. Walls of the box structure are apertured to admit an air flow for passage about the heat pack with partitions of the box structure being apertured to assure a convective flow of air ultimately discharged through openings in a closure component. Incoming air is constrained for passage in close proximity to a heat pack and then through the partition apertures for collection within a central chamber of the heater from which heated air passes in a convective manner. The closure of the box structure provides a virtually air tight closure to ensure a desired flow of heated air.

Important objectives of the present space heater include the provision of a box structure providing a convective flow of heated air from a rechargable heat source such as a heat pack or packs removably installed within the box structure; the provision of a space heater having a box structure of conductive material which provides both heating of a space by a convective air flow as well as components providing a radiant heat source; the provision of a space heater having a closure providing a virtually air tight box structure with a convective air flow being routed past heat packs into a central chamber and then discharged to the space being heated.

DETAILED DESCRIPTION OF THE DRAWINGS

In the accompanying drawings:

FIG. 1 is a perspective view with fragments broken away of the present space heater; and FIG. 2 is a cross-sectional view taken along line 2—2 of FIG. 1.

PREFERRED EMBODIMENTS OF THE INVENTION

With continuing attention to the drawings, wherein applied reference numerals indicate parts similarly hereinafter identified, the reference numeral 1 indicates generally a box structure having front and rear walls 2 and 3 with side walls at 4 and 5. A bottom is at B.

Front wall 2, as shown in FIG. 1, is typical of rear wall 3 in that a series of air inlets are at 6 immediately above the lower edge 2A of the wall. Similar inlets are at 7 in rear wall 3.

Box structure partitions at 8 and 9 define, along with outer walls 2 and 3, compartments at 10 and 11 for reception of heat packs or packets indicated at 12. The partitions 8 and 9, along with the walls 2, 3, 4, 5, preferably terminate upwardly in a plane for contact with a closure 13 to close compartments 10 and 11 other than for air inlets 6–7 and partition openings at 8A and 9A.

Per FIG. 2, it will be seen that the air drawn into compartments 10 and 11 will move upwardly past the actuated heat packs 12 and through openings 8A and 9A and into a central chamber at 16. Closure 13 defines a series of apertures at 18 through which the heated air passes. Heated air moving through chamber 16 is additionally subjected to heat radiated by the partitions 8 and 9. Chamber 16 is defined by said partitions, closure 13 and side walls 4 and 5.

Closure 13 is pivotly mounted as at 20 as by pivot pins extending through side flanges 13A of the closure. The pivot pins 20 are located below lid flange 13B to assure displacement of the flange away from rear wall 3 to permit opening of the closure and sealing of the box structure when closed. A top edge 3B of wall 3 forms a seal with flange 13B.

The packs or packets 12 may be of the type sold under the trademark THE HEAT SOURCE and manufactured by Prism Technology to mention one of many sources of such packs.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A portable space heater comprising,
   a box structure having a closure,
   partitions in said structure defining in conjunction with said structure compartments each for reception of a heat source,
   a first series of apertures in said box structure and a second series of apertures in said partitions, said second series of apertures in a horizontal plane offset above a horizontal plane containing said first series of apertures, heated air in said compartments inducing a convective airflow through said first and second series of apertures, and
   said closure having a third series of apertures through which heated air flows in a convective manner into the space being heated.

2. The portable space heater claimed in claim 1 wherein said box structure and said partitions also define a chamber through which heated air moves prior to discharge via said third series of apertures, said partitions constituting heat radiating surfaces heating air moving through said chamber.

3. The portable space heater claimed in claim 1 wherein said box structure includes a wall terminating upwardly in an edge, said closure having a flange in slidable engagement with said edge.

* * * * *